United States Patent
Cheng et al.

(10) Patent No.: US 9,693,436 B2
(45) Date of Patent: Jun. 27, 2017

(54) FLEXIBLE DISPLAYING APPARATUS

(71) Applicant: Innolux Corporation, Miao-Li County (TW)

(72) Inventors: Hsiang-Yuan Cheng, Miao-Li County (TW); Yue-Shih Jeng, Miao-Li County (TW); Yen-Shih Lin, Miao-Li County (TW); Wei-Chih Liu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 171 days.

(21) Appl. No.: 14/324,439

(22) Filed: Jul. 7, 2014

(65) Prior Publication Data

US 2015/0036257 A1   Feb. 5, 2015

(30) Foreign Application Priority Data

Aug. 2, 2013   (TW) ................. 102127850 A

(51) Int. Cl.
*H05F 1/02* (2006.01)
*G06F 1/16* (2006.01)

(52) U.S. Cl.
CPC ............. *H05F 1/02* (2013.01); *G06F 1/1652* (2013.01)

(58) Field of Classification Search
CPC ................................ H05F 1/02; G06F 1/1652
USPC .......................................................... 361/220
See application file for complete search history.

(56) References Cited

U.S. PATENT DOCUMENTS

| | | | | |
|---|---|---|---|---|
| 6,866,901 B2 * | 3/2005 | Burrows | ............... | H01L 23/564 257/28 |
| 2003/0203210 A1 * | 10/2003 | Graff | .................. | H01L 51/0097 428/412 |
| 2005/0214556 A1 * | 9/2005 | Nishimi | ............... | C08K 3/0008 428/500 |
| 2005/0249901 A1 * | 11/2005 | Yializis | .................... | B32B 7/02 428/35.7 |
| 2006/0028128 A1 * | 2/2006 | Ohkubo | ............. | H01L 51/5237 313/506 |
| 2006/0063015 A1 | 3/2006 | McCormick et al. | | |
| 2006/0068128 A1 * | 3/2006 | Greener | ................. | B05C 5/007 428/1.1 |

(Continued)

OTHER PUBLICATIONS

TW Office Action dated Oct. 13, 2014.

*Primary Examiner* — Thienvu Tran
*Assistant Examiner* — Kevin J Comber
(74) *Attorney, Agent, or Firm* — McClure, Qualey & Rodack, LLP

(57) ABSTRACT

A displaying apparatus includes a flexible substrate, at least one composite layer disposed on the flexible substrate, and an electronic device disposed on the composite layer. The composite layer includes a stack of an organic layer and an inorganic layer, and at least one of the inorganic layer and the organic layer includes at least one anti-static material, such as anti-static particles, an anti-static agent or an anti-static layer (e.g., transparent conductive layer/transparent conductive oxide layer, or polymeric conductive layer). The displaying apparatus of the embodiment enables the electronic device, such as the flexible electronic device, to achieve the product requirements, such as the flexibility, good resistance to water and vapor, and the ability of releasing the electrostatic charges and making the overall structure to release stresses.

10 Claims, 2 Drawing Sheets

(56) References Cited

U.S. PATENT DOCUMENTS

| | | | |
|---|---|---|---|
| 2009/0029149 A1* | 1/2009 | Kim | B05D 7/02 |
| | | | 428/323 |
| 2010/0089636 A1* | 4/2010 | Ramadas | B82Y 15/00 |
| | | | 174/521 |
| 2012/0045577 A1* | 2/2012 | Feret | C08G 65/336 |
| | | | 427/162 |

* cited by examiner

FLEXIBLE DISPLAYING APPARATUS

This application claims the benefit of Taiwan application Serial No. 102127850, filed Aug. 2, 2013, the subject matter of which is incorporated herein by reference.

BACKGROUND OF THE INVENTION

Field of the Invention

The invention relates in general to a displaying apparatus, and more particularly to a flexible displaying apparatus.

Description of the Related Art

An electronic product with a display includes a smart phone, a tablet computer (Pad), a notebook computer (Notebook), a monitor or even the television (TV)-associated products, and has become an indispensable necessity of the modern human beings in either the working-processing-learning or the personal leisure entertainment. In addition to seeking for the more excellent electronic property of the electronic product itself, such as the higher quality display effect, the higher response speed upon operation, the longer useful life and the higher stability, the consumer further expects more diversified functions.

With the more human oriented and more diversified development of the electronic product, the product design becomes more precise, and the requirement of the resistance to the water vapor and oxygen is relatively increased. If the amount of the water vapor/oxygen penetrated into the electronic device exceeds the acceptable amount of the applied device, it causes the oxidation and deterioration in the elements of the device, thereby affecting the display quality and shortening the operation lifetime of the electronic device. General indicators for judging the ability of a water vapor/oxygen barrier layer include the water vapor transmission rate (WVTR, $g/m^2/day$), and the oxygen transmission rate (OTR, $cm^3/m^2/day$). Various displays have their acceptable moisture penetrating amounts. For example, OTR and WVTR required for the substrate barrier layer of the liquid crystal display (LCD) must be no more than about 0.1 $cm^3/m^2/day$ and about 0.1 $g/m^2/day$, respectively. The organic light emitting diode display (OLED) has the most severe requirement on the gas blocking rate, wherein the required WVTR and OTR are typically not over $1\times10^{-6}$ $g/m^2/day$, and $10^{-5}$ to $10^{-3}$ $cm^3/m^2/day$, respectively.

In addition to the display quality and operating functions, the consumers also pursue the electronic product having light weight and slim appearance, which is easy to carry. A flexible electronic product with good flexibility just satisfies the demand for commercial market. In the flexible electronic product, an electronic device is mainly disposed on a flexible substrate. Currently, materials of the flexible substrate can be classified into three types: the thin glass, metal film and plastic substrate. The thin glass serves as the flexible substrate and has the excellent resistance to water vapor and oxygen, but has the drawback of easily broken during manufacture and transportation. Although the metal film serving as the flexible substrate has excellent resistance to water, vapor and oxygen and is also free from the broken issue of being easily broken, the flexibility of the metal film is poor. The plastic substrate serving as the flexible substrate has the excellent flexibility and is free from the broken issue, but has poor resistance to water, vapor and oxygen. Also, the electrostatic charges are easily generated at the plastic substrate by rubbing the insulating plastic substrate during the manufacturing processes and the process of transportation or carrier separation. If the electrostatic charges are not discharged, the electronic elements tend to be damaged. The existing solution is to improve the process environment to decrease or eliminate the generated charges, to add an electrostatic discharge protection (ESD protection) design to the circuit layout, to add a discharge path to the plastic substrate, or to adhere or coat an electrostatic discharge protection film after the element has been manufactured.

SUMMARY OF THE INVENTION

The invention is directed to a flexible displaying apparatus using a composite layer on a flexible substrate (e.g., plastic substrate) to solve the problems of the insufficient flexibility, the electrostatic charge accumulation, the insufficient resistance to water and vapor, the stress retention of the conventional flexible electronic devices.

According to the present invention, a displaying apparatus is provided. The displaying apparatus includes a flexible substrate, at least one composite layer disposed on the flexible substrate, and an electronic device disposed on the composite layer. The composite layer includes a stack of an organic layer and an inorganic layer. At least one of the inorganic layer and the organic layer includes at least one anti-static material.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
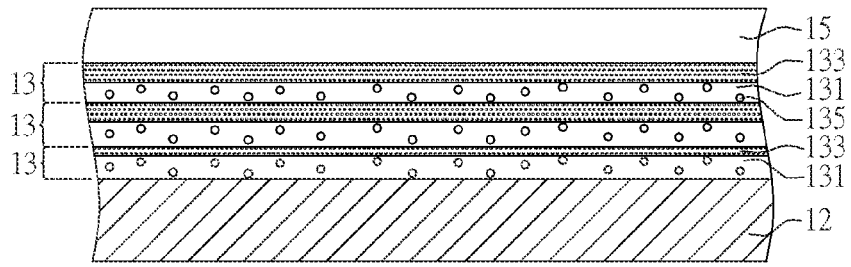
FIG. 1 is a cross-sectional view illustrating a flexible displaying apparatus according to a first embodiment of this disclosure.

This disclosure discloses a flexible displaying apparatus. The displaying apparatus of the embodiment at least includes a flexible substrate, at least one composite layer disposed on the flexible substrate, and an electronic device disposed on the composite layer. The composite layer comprises a stack of an organic layer and an inorganic layer, wherein at least one of the inorganic layer and the organic layer comprises at least one anti-static material. The anti-static material is in the form of, for example, anti-static particles or an anti-static layer. By constructing the embodied structure of the displaying apparatus, the electronic device, such as flexible electronic device, would be flexible, highly resistant to water vapor and oxygen, able to prevent the problems of the electrostatic charge accumulation and stress retention. The displaying apparatus of the embodiment can be widely applied in various applications, and examples of the electronic devices applicable to the embodiments of this disclosure include an organic light emitting diode (OLED) display, a sensor, an electro-phoretic display (EPD), an electrochromic display (ECD), an electrowetting display (EWD), a solar display panel (Solar PV).

Embodiments are provided hereinafter with reference to the accompanying drawings for describing the related configurations, but the present disclosure is not limited thereto. It is noted that the details of the structures of the embodiments are provided for exemplification, and the described details of the embodiments are not intended to limit the present disclosure. Further, the accompany drawings are simplified for clear illustrations of the embodiment; sizes and proportions in the drawings are not directly proportional to actual products, and shall not be construed as limitations to the present disclosure. Thus, the specification and the drawings are to be regard as an illustrative sense rather than a restrictive sense.

First Embodiment

FIG. 1 is a cross-sectional view illustrating a flexible displaying apparatus according to a first embodiment of this disclosure. Referring to FIG. 1, a displaying apparatus 10 of the first embodiment at least includes a flexible substrate 12, at least one composite layer 13 disposed on the flexible substrate 12, and an electronic device 15 disposed on the composite layer 13. The composite layer 13 includes at least one set of a stack of an organic layer 131 and an inorganic layer 133, wherein at least one of the organic layer 131 and the inorganic layer 133 includes at least one anti-static material. The anti-static material can be mixed or distributed in the organic layer 131, or distributed in the inorganic layer 133, or distributed in both the inorganic layer 133 and the organic layer 131. In the process of manufacturing the flexible displaying apparatus, the flexible substrate 12 can be supported by a carrier (e.g., a glass substrate) to perform the subsequent manufacturing processes. After the displaying apparatus is manufactured, the carrier is removed.

In one embodiment, the weight percentage of the anti-static material to the composite layer 13 is in a range of about 1 wt % to about 10 wt %.

In the first embodiment, the anti-static material can be a plurality of anti-static particles 135 or an anti-static agent mixed within at least one of the inorganic layer 133 and the organic layer 131. As shown in FIG. 1, the displaying apparatus 10 includes several sets of composite layers (e.g., three sets) stacked on the flexible substrate 12, wherein the anti-static material is in a form of plural anti-static particles 135 mixed or distributed in the organic layer 131.

In one embodiment, the anti-static particles 135 comprises one or more materials selected from conductive nano-particles, carbon fibers, carbon nano-tubes, nano-silver (nano-Ag) wires, or other material particles.

In one embodiment, the flexible substrate 12 is, for example, a plastic substrate, such as a polyimide (PI) substrate, or any other plastic substrate made of one or more suitable materials. In addition, a transparent substrate or an opaque substrate can be used as the flexible substrate 12 depending on the type of displaying apparatus in the application. The disclosure does not intend to restrict the material of the flexible substrate 12.

In this embodiment, the material of the inorganic layer 133 is, for example, silicon nitride (SiNx), silicon oxide (SiOx), silicon oxy-nitride (SiOxNy), or any other inorganic material with good resistance to water and vapor. The inorganic layer 133 is formed by a plasma-enhanced chemical vapor deposition (PECVD) or any other suitable manufacturing process, for example. In one embodiment, the inorganic layer 133 has a thickness ranging from about 100 Å to 1500 Å, for example. In another embodiment, the inorganic layer 133 has a thickness ranging from about 300 Å to 700 Å, for example.

In one embodiment, the material of the organic layer 131 is an organic polymer, or any other organic material with the good flexibility, for example. The organic layer 131 is formed by the manufacturing processes in the form of solution. For example, an organic solution is provided to form the organic layer 131 by way of spin coating, slit/slot die coating, solution casting or the like.

The spin coating process is easy to be proceeded and widely used in film formation applications, but it produces a lot of waste photoresist solution and the solvent to be post-treated. In addition, when the size of the substrate is enlarged (e.g., larger than 1.0 m×1.0 m), it is getting more and more difficult to maintain the coating uniformity of the film. In the process of slit coating, the coating solution is transferred to an extrusion mold through a precise quantitative pump. When the substrate is moved to the location under the mold, the coating solution contacts with the substrate to form a film. When the substrate is ready to be shifted away from the location under the mold, the contact between the coating solution and the substrate is interrupted. The slit coating has the advantages that the thickness of the coating can be set in advance, and the uniformity and stability of films in the long-term operation are relatively high. The solution casting technology has the advantages of the uniform film thickness distribution and the very smooth coating, as well as the advantage that the high-temperature-resistant film can be obtained. In the practical application, suitable solution process for manufacturing the organic layer 131 can be selected according to multiple considerations, such as the properties of the organic material and the restrictions and requirements of the applications.

In one embodiment, the anti-static particles 135 are uniformly distributed in the organic solution. After the solution is coated, the organic layer 131 distributed with the anti-static particles 135 can be formed. In one embodiment, the organic layer 131 has a thickness ranging from about 1000 Å to 10000 Å, for example. In another embodiment, the organic layer 131 has a thickness ranging from about 3000 Å to 5000 Å.

Furthermore, in the embodiment, if multiple sets of composite layers 13 are formed on the flexible substrate 12, then the organic layers 131 of different sets of composite layers may have the same thickness or different thicknesses. Similarly, the inorganic layers 133 in different sets of composite layers have the same thickness or different thicknesses. There is no particular limitation thereto.

According to the composite layer proposed by the above-mentioned embodiment, the organic layer 131 provides the flexibility, the inorganic layer 133 is able to block gases, such as water vapor or oxygen, from permeating the electronic device, and the anti-static material (in the form of particles, agent or film) added to the composite layer is able to discharge and prevent the electrostatic charges accumulated in the processes of manufacturing the substrate, thereby protecting the material of the electronic device from being damaged by the electrostatic charges. In one embodiment, a surface resistivity of the composite layer 13 of the displaying apparatus is less than $10^{11}\Omega$ (e.g., in the range from $10^7\Omega$ to $10^{11}\Omega$).

Furthermore, regarding one set or multiple sets of stacked structures of the organic layer 131 and the inorganic layer 133 proposed in this embodiment, if any fine crack is generated in the inorganic layer 133, then the presence of the organic layer 131 can lengthen the water vapor penetration path. More particularly, regarding multiple sets of the composite layer stacked structures, an organic layer 131 interposed between two inorganic layers 133 can effectively block the penetration of water and vapor.

Upon the practical application, it is possible to adjust and change the condition of the composite layer according to the actual requirement of the application device. For example, the number of sets of the composite layers can be changed, and the thicknesses of the organic layer 131 and the inorganic layer 133 can be adjusted to satisfy the requirements of the application device on the water vapor transmission. For example, the requirements of the liquid crystal display and the electro-phoretic display (EPD) on the water vapor transmission rate (WVTR) are in a range from $10^0$ to $10^{-2}$ $g/m^2/day$; the requirement of the organic light emitting diode display (OLED) on the water vapor transmission rate does not exceed $10^{-6}$ $g/m^2/day$. In one embodiment, a water vapor transmission rate of the composite layer is less than $5\times10^{-6}$ $g/m^2/day$.

Furthermore, one set or multiple sets of stacked structures of the organic layer 131 and the inorganic layer 133 disclosed in this embodiment provide the flexibility and adjust the stress of the overall structure. For example, the number of the sets of the composite layers can be adjusted, or the thicknesses of the organic layer 131 and the inorganic layer 133 can be adjusted in order to reach the flexibility required by the applied device and release stresses to avoid stress retention on the applied device. In one embodiment, the stack of the flexible substrate 12, the one set or multiple sets of composite layer 13 and the electronic device 15 has a total stress (stress in sum) substantially equal to 0, and the total stress measured by an instrument is in a range of about −10 Mpa to 10 Mpa.

Second Embodiment

Figure 2:
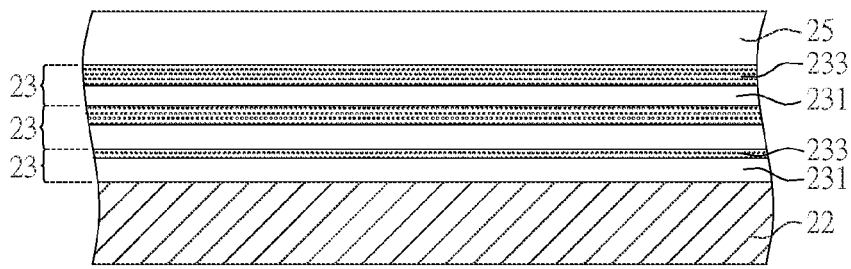
FIG. 2 is a cross-sectional view illustrating a flexible displaying apparatus according to a second embodiment of this disclosure.

FIG. 2 is a cross-sectional view illustrating a flexible displaying apparatus according to a second embodiment of this disclosure. Referring to FIG. 2, a displaying apparatus 20 of the second embodiment at least includes a flexible substrate 22, at least one composite layer 23 disposed on the flexible substrate 22, and an electronic device 25 disposed on the composite layer 23. The composite layer 23 includes at least one set of stack of an organic layer 231 and an inorganic layer 233, wherein at least one of the organic layer 231 and the inorganic layer 233 includes at least one anti-static material. In the manufacturing processes, the flexible substrate 22 can be supported by a carrier (e.g., a glass substrate) to perform the subsequent processes, and the carrier is removed after the displaying apparatus has been manufactured.

The difference of the anti-static particles between the first and second embodiments is that the anti-static material of the second embodiment is a conductive polymer, and a conductive polymer layer formed as an organic layer 231 in the second embodiment. This conductive polymer layer has the anti-static property. In one embodiment, the material of the conductive polymer layer is the [Poly(3,4-ethylenedioxythiophene): poly(4-styrenesulfonate), PEDOT:PSS]. PEDOT:PSS is an aqueous solution of a highly conductive polymer and is composed of two substances including PEDOT and PSS, wherein different polymer aqueous solutions with different conductivities can be obtained according to different formulas. The presence of PSS increases the solubility of the PEDOT. PEDOT:PSS can replace the ITO to be the transparent conductive material in the flexible electronic device, and has the resistivity that almost does not increase with the increase of the number of bending times. The chemical formulas of PEDOT:PSS are presented as follow.

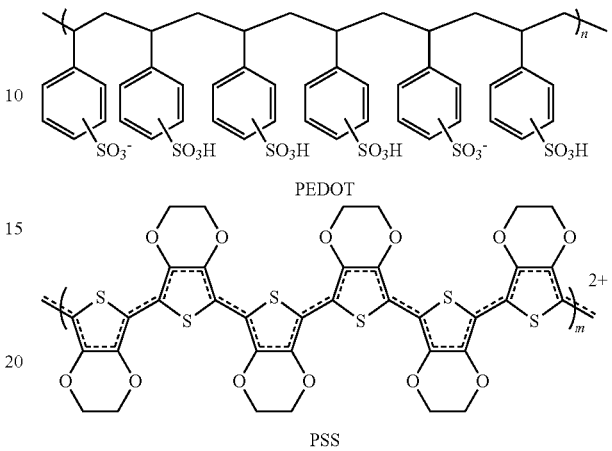

Besides PEDOT:PSS, any other conductive polymer materials having suitable property (e.g., transparency, flexibility, discharging property of the electrostatic charges, or the like) can also be adopted in the application. This disclosure has no particular limitation to the material of conductive polymer.

Similarly, as shown in FIG. 2, the displaying apparatus 20 can non-restrictively include a plurality of sets (e.g., 3 sets) of stacks of composite layers 23 formed on the flexible substrate 22. Each set of the composite layer 23 includes a conductive polymer layer (organic layer 231) and an inorganic layer 233. Furthermore, the conductive polymer layers (organic layers 231) in different sets of composite layers in this embodiment have the same thickness or different thicknesses, and the inorganic layers 233 in different sets of the composite layers 23 have the same thickness or different thicknesses. However, restrictions thereof will not be made.

In one embodiment, the inorganic layer 233 has a thickness ranging from about 100 Å to 1500 Å. In another embodiment, the inorganic layer 233 has a thickness ranging from about 300 Å to 700 Å. In one embodiment, the organic layer 231 (conductive polymer layer) has a thickness ranging from about 1000 Å to 10000 Å. In another embodiment, the organic layer 231 has a thickness ranging from about 3000 Å to 5000 Å.

Descriptions of other elements of the structure (e.g., the materials of the flexible substrate 22 and the inorganic layer 233) as well as the manufacturing processes of the inorganic layer 233 and the conductive polymer layer (organic layer 231) are similar to those described in the first embodiment, and the details are not redundantly repeated.

According to the composite layer of the second embodiment, the conductive polymer layer (organic layer 231) provides the flexibility and discharges the charges (provides the electrostatic discharge protection), and the inorganic layer 233 can block the gas, such as water vapor or oxygen, from penetrating the electronic device. Also, the presence of the conductive polymer layer (organic layer 231) can also lengthen the water vapor penetration path, so that the composite layer structure constituted by the conductive polymer layer (organic layer 231) and the inorganic layer 233 can effectively block the penetration of water and vapor.

Furthermore, the one set or multiple sets of the stacked structures of the conductive polymer layer (organic layer 231) and the inorganic layer 233 of this embodiment can adjust the overall stress of the whole structure, reach the required flexibility of the application device, and further release the stress to avoid the stress retention.

According to the displaying apparatus of the second embodiment, a water vapor transmission rate (WVTR) of the composite layer 23 is less than $5 \times 10^{-6}$ g/m$^2$/day. In one embodiment, a surface resistivity of the composite layer 23 of the displaying apparatus is less than $10^{11}\Omega$ (e.g., ranging from $10^{7}\Omega$ to $10^{11}\Omega$). In one embodiment, the stack of the flexible substrate 22, the one set or multiple sets of composite layer 23 and the electronic device 25 has a total stress (or stress in sum) substantially equal to 0, and the total stress measured by an instrument ranges from about −10 Mpa to 10 Mpa.

Third Embodiment

Figure 3:
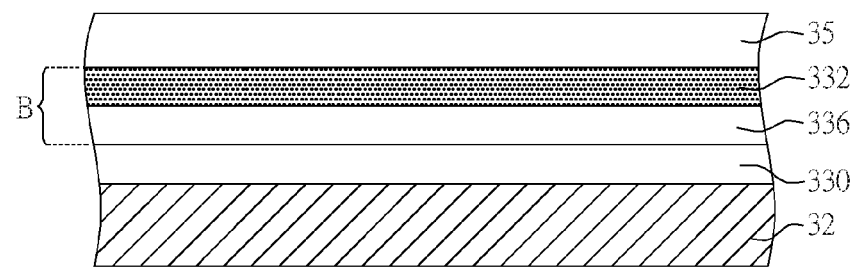
FIG. 3 is a cross-sectional view illustrating a flexible displaying apparatus according to a third embodiment of this disclosure.

FIG. 3 is a cross-sectional view illustrating a flexible displaying apparatus according to a third embodiment of this disclosure. Referring to FIG. 3, a displaying apparatus 30 at least includes a flexible substrate 32, at least one composite layer disposed on the flexible substrate 32, and an electronic device 35 disposed on the composite layer in the third embodiment. In the manufacturing processes, the flexible substrate 32 can be supported by a carrier (e.g., a glass substrate) in a similar manner to perform the subsequent processes, and the carrier is removed after the displaying apparatus has been manufactured.

In the third embodiment, the inorganic layer is an inorganic conductive layer 330. Therefore, the composite layer includes the inorganic conductive layer 330 and an organic layer 336 stacked on the inorganic conductive layer 330. The inorganic conductive layer 330 includes an anti-static material, such as a transparent conductor (TC) or a transparent conductive oxide (TCO) to provide an electrostatic discharge path. Examples of the transparent conductor (TC) include a carbon nano-tube, a nano-silver wire (nano-Ag wire), a graphene and any other transparent conductive materials. The transparent conductive oxide (TCO) is, for example, the ITO, IZO or any other transparent conductive oxide materials.

In one embodiment, the transparent conductor (TC) has a thickness ranging from about 100 Å to 1500 Å, and can be formed by sputtering.

In one embodiment, the transparent conductive oxide (TCO) has a thickness ranging from about 100 Å to 1500 Å, and can be formed by the manufacturing process in the form of solution, such as spin coating, slit/slot die coating, solution casting or the like.

Furthermore, the composite layer in the third embodiment further includes an inorganic layer 332 disposed on the organic layer 336. The inorganic layer 332 and the organic layer 336 may also be regarded as a barrier B on the inorganic conductive layer 330 (e.g., the transparent conductive layer TC or the transparent conductive oxide layer TCO). In the practical application, the barrier B may also include multiple sets of the inorganic layers 332 and the organic layers 336, and be stacked on the inorganic conductive layer 330. Therefore, this barrier B is disposed between the electronic device 35 and the inorganic conductive layer 330 (e.g., TC/TCO).

According to the composite layer of the third embodiment, the inorganic conductive layer 330 discharges the charges (i.e. providing electrostatic discharge protection), the organic layer 336 provides the flexibility, and the inorganic layer 332 blocks the gas, such as water vapor or oxygen, form penetrating the electronic device. Furthermore, one set or multiple sets of the combinations of the inorganic layers 332 and the organic layers 336 (e.g., the barrier B) can provide the flexibility, effectively block the penetration of water and vapor, and adjust the overall stress of the whole structure to release the stresses.

The displaying apparatus of the third embodiment can be widely applied in various applications, and is particularly suitable for applications of transparent OLEDs, downward lighting OLEDs and touch sensors.

According to the displaying apparatus of the third embodiment, a water vapor transmission rate (WVTR) is less than $5 \times 10^{-6}$ g/m$^2$/day. In one embodiment, a surface resistivity of the composite layer of the displaying apparatus is less than $10^{11}\Omega$ (e.g., ranging from $10^{7}\Omega$ to $10^{11}\Omega$). In one embodiment, the stacked structure of the flexible substrate 32, the stacked inorganic layer 332/organic layer 336/inorganic conductive layer 330 and the electronic device 35 has a total stress substantially equal to 0.

Fourth Embodiment

Figure 4:
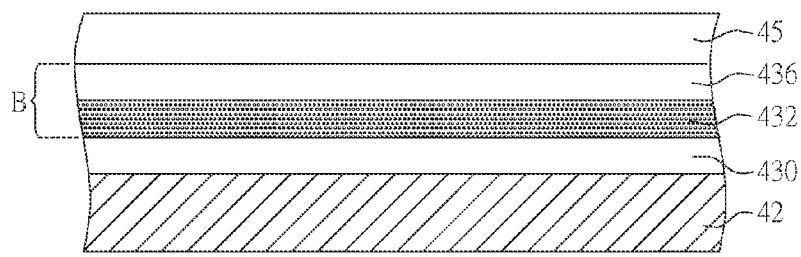
FIG. 4 is a cross-sectional view illustrating a flexible displaying apparatus according to a fourth embodiment of this disclosure.

FIG. 4 is a cross-sectional view illustrating a flexible displaying apparatus according to a fourth embodiment of this disclosure. Referring to FIG. 4, a displaying apparatus 40 of the fourth embodiment at least includes a flexible substrate 42, at least one composite layer disposed on the flexible substrate 42, and an electronic device 45 disposed on the composite layer. In the manufacturing processes, the flexible substrate 42 can be supported by a carrier (e.g., a glass substrate) in a similar manner to perform the subsequent processes, and the carrier is removed after the displaying apparatus has been manufactured.

In the fourth embodiment, the organic layer is a conductive polymer layer 430. Thus, the composite layer includes the conductive polymer layer 430 and an inorganic layer 432 stacked on the conductive polymer layer 430. The material of the conductive polymer layer 430 is, for example, an organic material of PEDOT:PSS or any other organic conductive polymer material to provide the electrostatic discharge path.

The conductive polymer layer 430 has a thickness ranging from about 1000 Å to 10000 Å in one embodiment, and from about 100 Å to 1500 Å in another embodiment. The descriptions and manufacturing processes associated with the conductive polymer layer 430 are similar to those described in the second embodiment, and the details are not redundantly repeated.

The composite layer further includes an organic layer 436 disposed on the inorganic layer 432. As shown in FIG. 4, the conductive polymer layer 430 is disposed on the flexible substrate 42, the inorganic layer 432 is disposed on the conductive polymer layer 430, and the organic layer 436 is disposed on the inorganic layer 432. Thus, the conductive polymer layer 430 and the organic layer 436 are disposed on two sides of the inorganic layer 432, respectively.

In the fourth embodiment, the organic layer 436 and the inorganic layer 432 may also be regarded as a barrier B on the conductive polymer layer 430. In the practical application, the barrier B may also include multiple sets of the organic layers 436 and the inorganic layers 432 stacked on the conductive polymer layer 430. Thus, this barrier B is disposed between the electronic device 45 and the conductive polymer layer 430.

According to the composite layer of the fourth embodiment, the conductive polymer layer 430 is able to discharge the charges (electrostatic discharge protection) and provides the flexibility, while the inorganic layer 432 is able to block the gas, such as water vapor or oxygen, from penetrating the electronic device. Furthermore, one set or multiple sets of the combinations of the organic layers 436 and the inorganic layer 432 (i.e., the barrier B) can provide the flexibility, effectively block the penetration of water and vapor, and adjust the stress of the overall structure to release the stresses.

According to the displaying apparatus of the fourth embodiment, a water vapor transmission rate (WVTR) is less than $5\times10^{-6}$ g/m$^2$/day. In one embodiment, a surface resistivity of the composite layer of the displaying apparatus is less than $10^{11}\Omega$ (e.g., ranging from $10^7\Omega$ to $10^{11}\Omega$). In one embodiment, the stacked structure of the flexible substrate 42, the stacked organic layer 436/inorganic layer 432/conductive polymer layer 430 and the electronic device 45 has a total stress substantially equal to 0, and the total stress measured by an instrument ranges from about −10 Mpa to 10 Mpa.

Fifth Embodiment

Figure 5:
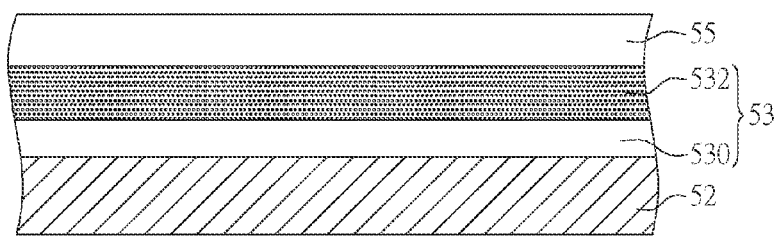
FIG. 5 is a cross-sectional view illustrating a flexible displaying apparatus according to a fifth embodiment of this disclosure.

FIG. 5 is a cross-sectional view illustrating a flexible displaying apparatus according to a fifth embodiment of this disclosure. Referring to FIG. 5, a displaying apparatus 50 of the fifth embodiment includes a flexible substrate 52, at least one composite layer 53 disposed on the flexible substrate 52, and an electronic device 55 disposed on the composite layer 53. In the manufacturing processes, the flexible substrate 52 can be supported by a carrier (e.g., a glass substrate) in a similar manner to perform the subsequent processes, and the carrier is removed after the displaying apparatus has been manufactured.

In the fifth embodiment, the composite layer 53 includes a conductive polymer layer 530 and an inorganic layer 532 formed on the conductive polymer layer 530. The material of the conductive polymer layer 530 is, for example, an organic material of PEDOT:PSS or any other organic conductive polymer material to provide the electrostatic discharge path. The difference between the fourth and fifth embodiments is that only the inorganic layer 532 of the pure inorganic material, such as silicon nitride (SiNx), silicon oxide (SiOx), silicon oxy-nitride (SiOxNy), or any other inorganic material with good resistance to water and vapor is stacked on the conductive polymer layer 530 in the fifth embodiment.

The conductive polymer layer 530 has a thickness ranging from about 1000 Å to 10000 Å in one embodiment, and from about 100 Å to 1500 Å in another embodiment. The descriptions and manufacturing processes associated with the conductive polymer layer 530 are similar to those described in the second embodiment, and the details are not redundantly repeated.

According to the composite layer of the fifth embodiment, the conductive polymer layer 530 can discharge the charges (electrostatic discharge protection) and provide the flexibility, and the inorganic layer 532 can block the gas, such as water vapor or oxygen, from penetrating the electronic device. Furthermore, the combination of the conductive polymer layer 530 and the inorganic layer 532 can also be used to adjust the stress of the overall structure to release the stresses.

According to the displaying apparatus of the fifth embodiment, a water vapor transmission rate (WVTR) is less than $5\times10^{-6}$ g/m$^2$/day. In one embodiment, a surface resistivity of the composite layer 53 of the displaying apparatus is less than $10^{11}\Omega$ (e.g., ranging from $10^7\Omega$ to $10^{11}\Omega$). In one embodiment, the stacked structure of the flexible substrate 52, the inorganic layer 532, the conductive polymer layer 530 and the electronic device 55 has a total stress substantially equal to 0, and the total stress measured by an instrument ranges from about −10 Mpa to 10 Mpa.

Although each of the above-mentioned embodiments and the associated FIG. 1 to FIG. 5 only depicts one flexible substrate for disposing the composite layers for illustration, the disclosure is not restricted thereto. The disclosure can be applied to the displaying apparatus with multiple substrates. For example, in another embodiment, a combination of the flexible substrate and the composite layer can further be formed on the electronic device (e.g., 15/25/35/45/55). For instance, another or multiple composite layers (formed on another flexible substrate) can also be formed on the electronic device to protect the electronic device.

Sixth Embodiment

Figure 6:
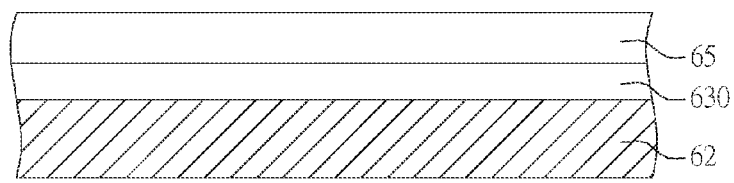
FIG. 6 is a cross-sectional view illustrating a flexible displaying apparatus according to a sixth embodiment of this disclosure.

FIG. 6 is a cross-sectional view illustrating a flexible displaying apparatus according to a sixth embodiment of this disclosure. Referring to FIG. 6, a displaying apparatus 60 of the sixth embodiment includes a flexible substrate 62, a conductive polymer layer 630 disposed on the flexible substrate 62, and an electronic device 65 disposed on the conductive polymer layer 630. The material of the conductive polymer layer 630 is, for example, an organic material of PEDOT:PSS or any other organic conductive polymer material to provide the electrostatic discharge path. In the manufacturing processes, the flexible substrate 62 can be supported by a carrier (e.g., a glass substrate) to perform the subsequent processes, and the carrier is removed after the displaying apparatus has been manufactured.

The conductive polymer layer 630 has a thickness ranging from about 1000 Å to 10000 Å in one embodiment, and from about 100 Å to 1500 Å in another embodiment. The descriptions and manufacturing processes associated with the conductive polymer layer 630 are similar to those described in the second embodiment, and the details are not redundantly repeated.

According to the displaying apparatus of the sixth embodiment, the conductive polymer layer 630 can discharge the charges (electrostatic discharge protection) and provide the flexibility, can also adjust the overall stress of the whole structure to release the stress so that a total stress of the stacked structure approaches 0, and the total stress measured by an instrument ranges from about −10 Mpa to 10 Mpa.

The displaying apparatus of the sixth embodiment is suitable for the applications to a sensor and an electrophoretic display (EPD).

According to each of the displaying apparatuses having the flexibility and the electrostatic discharge protection in the above-mentioned embodiments, the stacked structure of an inorganic layer and an organic layer is provided, and at least one of the inorganic layer and the organic layer includes at least one anti-static material, which is in the form of the anti-static particles, an anti-static agent, or an anti-static layer (e.g., TC/TCO or polymeric conductive layer), for example. The displaying apparatus of the embodiment enables the electronic device (e.g., the flexible electronic device) to meet the product requirements of flexibility and gas-resistance, and can discharge the electrostatic charges to provide electrostatic discharge protection. Furthermore, the overall structure can release the stress to avoid the problem of stress retention by modifying the thicknesses and/or number of the stack layers of the organic materials and the inorganic materials. The displaying apparatus of the embodiment can be widely applied in various applications, such as the organic light emitting diode display (OLED), sensor, electro-phoretic display (EPD), electrochromic display (ECD), electrowetting display (EWD), solar display panel (Solar PV) and the like.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A displaying apparatus, comprising:
   a flexible substrate;
   at least one composite layer disposed on the flexible substrate, and the at least one composite layer comprising an organic layer and an inorganic layer disposed above the organic layer; and
   an electronic device disposed on the at least one composite layer, wherein the organic layer is in contact with the flexible substrate and comprises at least one anti-static material, and the inorganic layer is in contact with the electronic device.

2. The displaying apparatus according to claim 1, wherein the anti-static material comprises a plurality of anti-static particles or an anti-static agent, mixed within the organic layer.

3. The displaying apparatus according to claim 1, wherein said anti-static material is a conductive polymer.

4. The displaying apparatus according to claim 3, wherein the at least one composite layer further comprises an another organic layer.

5. The displaying apparatus according to claim 1, wherein the inorganic layer comprises an another anti-static material, and said another anti-static material is a transparent conductive material.

6. The displaying apparatus according to claim 5, wherein the at least one composite layer further comprises an another inorganic layer.

7. The displaying apparatus according to claim 1, wherein a water vapor transmission rate of the at least one composite layer is less than $5 \times 10^{-6}$ g/m$^2$/day.

8. The displaying apparatus according to claim 1, wherein a weight percentage of the anti-static material to the at least one composite layer ranges from 1 wt % to 10 wt %.

9. The displaying apparatus according to claim 1, wherein a surface resistivity of the at least one composite layer is less than $10^{11}\Omega$.

10. The displaying apparatus according to claim 1, wherein a stack of the flexible substrate, the at least one composite layer and the electronic device has a total stress substantially equal to 0.

* * * * *